United States Patent [19]

Koch

[11] Patent Number: 5,573,993

[45] Date of Patent: Nov. 12, 1996

[54] PROCESS FOR THE PREPARATION OF A CATALYST FOR THE POLYMERIZATION OF OLEFINS AND CATALYST OBTAINED THEREBY

[75] Inventor: Benoît Koch, Hannut, Belgium

[73] Assignee: Solvay(Société Anonyme), Brussels, Belgium

[21] Appl. No.: 272,287

[22] Filed: Jul. 8, 1994

Related U.S. Application Data

[63] Continuation of Ser. No. 958,156, Oct. 9, 1992, abandoned.

[30] Foreign Application Priority Data

Oct. 14, 1991 [BE] Belgium ............................ 09100942

[51] Int. Cl.$^6$ .................................................. B01J 23/26
[52] U.S. Cl. ........................ 502/319; 502/171; 502/227; 502/242; 502/320
[58] Field of Search ............................ 502/171, 227, 502/242, 256, 309, 319, 320, 241, 324

[56] References Cited

U.S. PATENT DOCUMENTS

| | | | |
|---|---|---|---|
| 2,825,721 | 3/1958 | Hogan et al. | 502/256 |
| 3,622,521 | 11/1971 | Hogen et al. | 502/154 |
| 3,953,413 | 4/1976 | Hwang et al. | 526/350 |
| 4,053,437 | 10/1977 | Liu et al. | 252/450 |
| 4,284,527 | 8/1981 | Pullukat et al. | 502/154 |
| 4,384,987 | 5/1983 | Howley | 502/241 |

FOREIGN PATENT DOCUMENTS

| | | |
|---|---|---|
| 0055866A2 | 7/1982 | European Pat. Off. |
| 814295 | 6/1959 | United Kingdom. |
| 2050858 | 1/1981 | United Kingdom. |

OTHER PUBLICATIONS

*Handbook Of Chemistry And Physics*, 50th Edition, p. B-3, 1969–1970.

*Primary Examiner*—Asok Pal
*Attorney, Agent, or Firm*—Spencer & Frank

[57] ABSTRACT

A process for the preparation of an activated catalyst for the polymerization of olefins, includes mixing, in the absence of a solvent, at least one chromium salt with a support composition including at least one compound (A) which is an inorganic, oxygen-containing compound of at least one element selected from the group consisting of Group IVb, IIIa and IVa, and at least one compound (B) which is an inorganic compound containing at least one element selected from the group consisting of Group IVb and IIIa, the at least one compound (B) being different from the at least one compound (A); preactivating the mixture by heating in an oxidizing atmosphere at a temperature which is lower than the melting temperature of the at least one chromium salt to obtain a catalyst precursor; and activating the catalyst precursor by calcining in an oxidizing atmosphere and under conditions such that part of the chromium is converted to hexavalent chromium.

15 Claims, No Drawings

PROCESS FOR THE PREPARATION OF A CATALYST FOR THE POLYMERIZATION OF OLEFINS AND CATALYST OBTAINED THEREBY

This application is a Continuation of application Ser. No. 07/958,156 filed Oct. 9, 1992, now abandoned.

BACKGROUND OF THE INVENTION

1. Field of the Invention

The present invention relates to a process for the preparation of catalysts for the polymerisation of olefins, to the catalysts obtained by this process and to a process for polymerising olefins in the presence of these catalysts.

2. Description of the Related Art

It is known to polymerise olefins such as ethylene by means of a catalyst containing chromium deposited on a support which may be silica, alumina, zirconia or thoria. The synthesis of these catalysts in most cases comprises a final stage of calcination in an oxidising atmosphere, under conditions such that part of the chromium is converted to hexavalent chromium (U.S. Pat No. 2,825,721 (Phillips Petroleum)).

These catalysts are generally obtained by dispersing the support in aqueous or organic solutions of chromium compounds. The industrial production of catalysts according to this process involves drying the catalysts, recycling the chromium solutions and treating effluents liable to contain chromium compounds before they are discharged. Such a process is long and complex.

A simpler process consists in performing an intimate and solvent-free mixing of chromium trioxide ($CrO_3$) and of the support and then calcining it (U.S. Pat. No. 2,825,721 (Phillips Petroleum)). The dispersion of the chromium on the support is improved by performing the mixing of the reactants at a temperature of between 93° and 190° C. (Patent GB-814,295 (Phillips Petroleum)). The catalysts thus obtained nevertheless have a large quantity of chromium sesquioxide ($Cr_2O_3$) agglomerates which are inactive in polymerisation, which are found again, unchanged, in the polymers whose properties they alter.

The preparation of catalysts containing chromium by dry mixing of the supports with organic chromium compounds, followed by a heat treatment under a nonoxidising atmosphere comprising successive plateaus at 177° C., 290° C. and 900° C. has also been described (U.S. Pat. No. 3,953,413 (Chemplex Co.)). The catalysts obtained by this process contain black carbon residues and exhibit mediocre activities. Their performance can be improved if the heat treatment is terminated by a posttreatment in an oxidising medium for a sufficiently short period to remove the carbon residues (U.S. Pat. No. 4,053,437 (Chemplex Co.)). Such a particularly long and complex procedure involves the use of sophisticated pieces of apparatus capable of working in an inert atmosphere.

SUMMARY OF THE INVENTION

There has now been found a process for the preparation of catalysts for the polymerisation of olefins which is particularly simple, which does not involve the use of any solvent and which does not present the disadvantages of the processes of this type, described above.

To this end, the present invention relates to a process for the preparation of catalysts for the polymerisation of olefins, comprising:
a) the mixing of a support containing at least one compound (A) as defined below with at least one chromium salt;
b) the preactivation of the said mixture by heating under an oxidising atmosphere, at a temperature which is lower than the melting temperature of the chromium salt to obtain a catalyst precursor;
c) the activation of this precursor by calcining under at least an oxidising atmosphere, in conditions such that at least part of the chromium is converted to hexavalent chromium.

The supports capable of being employed in the process according to the invention are powders containing at least one compound (A) chosen from the oxygen compounds of the elements of groups IVb, IIIa and IVa of the Periodic Table (version published in the Handbook of Chemistry and Physics, 50th edition, page B-3 1969–1970). Titanium, zirconium, aluminium, silicon or thorium oxides, aluminium phosphate and mixtures thereof can thus be employed as compounds (A). The supports which give particularly good results are supports containing silica, alumina, aluminium phosphate or mixtures of these compounds as compounds (A).

When it is desired to obtain catalysts capable of producing polymers exhibiting lower average molecular weights, reflected in higher melt indexes, which can be converted more easily using conventional processing methods, these supports may also contain at least one compound (B) of at least one element of groups IVb and IIIa of the Periodic Table, the compound (B) being different from the compound (A) and being, for example, selected from titanium, zirconium and aluminium compounds, the titanium compounds being preferred in most cases.

The compound (A) is generally the main constituent of these supports. Its concentration is generally at least 50% by weight, preferably higher than 90% by weight and more particularly higher than 93% by weight relative to the total weight of the support. The other constituents of the support are generally chosen from the compounds (B).

When the compound (A) is a silica, the compounds (B) which give the best results are titanium, zirconium and aluminium oxides and aluminium phosphate. When the compound (B) is a titanium or zirconium oxide, its concentration in the silica is in most cases at least 0.1%, preferably at least 0.5%, more particularly at least 1% by weight relative to the total weight of the support. In general, the concentration of compound (B) does not exceed 15%, preferably 10% and more particularly 6% of the total weight of the support. In the case of silica-based supports which contain aluminium compounds as compound (B), the concentration of aluminium compounds, which is substantially higher, is generally between 0.1% and 50% by weight relative to the total weight of the support. For example, very good results are obtained when using silica-based supports containing up to 50% by weight of aluminium phosphate ($ALPO_4$) or by incorporating from 0.5 to 20% by weight of alumina in this silica.

When the compound (A) is an alumina, the concentration of $Al_2O_3$ in the support is generally higher than 80% by weight, in particular higher than 85% by weight relative to the total weight of the support. Aluminabased supports containing from 0.1% to 20% by weight, preferably from 0.5 to 15% by weight of aluminium phosphate or of titanium dioxide relative to the total weight of the support give particularly good results.

Supports in which the compound (A) is aluminium phosphate can also be employed in the process according to the invention. The compounds (B) are then in most cases chosen from, alumina and titanium dioxide.

The supports which can be employed in the process according to the invention generally consist of particles between 5 and 200 μm in size, additionally characterised by:

a specific surface which is generally higher than 3 m²/g and preferably higher than 150 m²/g; the specific surfaces can thus reach 900 m²/g. The supports most commonly employed have a specific surface of between 200 and 700 m²/g, and a pore volume of between 0.1% and 3.5 cm³/g, preferably between 1 and 2.5 cm³/g, more particularly between 1.2 and 2.2 cm³/g.

In the process according to the invention it may be found advantageous to employ supports exhibiting a narrow particle size distribution.

Such supports are well known in the art. Their preparation can be performed, for example, in a conventional way using precipitation and coprecipitation techniques or using any other known manner such as, in particular, the gelling of colloidal solutions. In the particular case of the supports containing titanium compounds, these compounds can also be introduced by impregnating the support with a nonaqueous solution of a titanium alcoholate, as described in U.S. Pat. No. 3,622,521 (Phillips Petroleum), the content of which is incorporated by reference in the present description.

It is obvious that the supports which can be employed in the process according to the invention can contain a number of compounds (A) and a number of compounds (B).

In an advantageous embodiment of the process according to the invention the compound (A) is treated in the solid state with a gas containing the compound (B). The compound (B) is preferably employed for this purpose in the form of halides, for example titanium tetrachloride or silicon tetrafluoride.

This embodiment of the process according to the invention can be carried out in a stationary-bed reactor, in an agitated- or fluidised-bed reactor or in a rotary reactor. The best results are obtained in a fluidised bed where a bed of particles of compound (A) is used, which is fluidised by means of a gas containing the compound (B). This fluidising gas may consist of the compound (B). In general it consists of the compound (B) and of a carrier gas which is inert towards the compounds (A) and (B), whose function is to entrain the compound (B) into the fluidised bed. By way of examples, nitrogen, argon, air and mixtures thereof, preferably in the dry state, may be mentioned as a carrier gas.

In this advantageous embodiment it may be found desirable, before treating the compound (A) with the compound (B), to subject the compound (A) to a preactivation by any known means, especially by heating to a temperature between room temperature and the sintering temperature of the compound (A).

Stage (a) of the process according to the invention consists of the carrying out of homogeneous mixing of the support and of at least one chromium salt. This mixing can be performed by any known methods. It is preferable, however, to perform a simple bringing of the support into contact with the chromium salt, followed by agitation so as to obtain a reasonably homogeneous mixture.

In most cases the mixing of the support and of the chromium salt is performed at room temperature. In the process of the invention the mixing of the support with the chromium salt takes place in the absence of any significant quantity of a solvent for the said chromium compound.

The chromium salts capable of being employed in the process according to the invention are inorganic chromium salts such as chromium chloride, nitrate and sulphate or such as ammonium chromate or dichromate and organic chromium salts such as chromium acetate, t-butyl chromate or chromium acetylacetonate. Organic chromium salts are particularly preferred. Among them, chromium acetylacetonate gives particularly good results.

The quantity of chromium salt which is introduced into the mixture is such that the chromium is present therein in proportions varying from 0.05 to 10% by weight, preferably from 0.1% to 5 % by weight, more particularly from 0.25 to 2% by weight relative to the total weight of the mixture.

The chromium salt generally takes the form of a powder, preferably exhibiting a particle size which is appropriate in order that, during stages (b) and (c), the mixture of the support and of the chromium salt obtained in stage (a) should remain homogeneous without a segregation of phases taking place. For this purpose the chromium salt preferably consists of particles whose size is of the same order of magnitude as that of the support. Chromium salt powders which have produced very good results are those in which the particles are between 5 and 200 μm in size.

When the particles of the chromium salt are relatively large it may be found useful to grind them beforehand. The precise determination of the conditions for the use of this salt can therefore require a few preliminary routine tests.

In a particular embodiment of the process according to the invention, using a support comprising a compound (B) in addition to the compound (A), stage (a) is performed in a bed of particles of the compound (A) and of particles of the chromium salt, which are fluidised by means of a gas containing the compound (B).

The preactivation stage (b) is performed by heating the mixture defined above, under an oxidising atmosphere, to a temperature which is lower than the melting temperature of the chromium salt so as to obtain a catalyst precursor. Good results are generally obtained when the preactivation temperature is at least 5° C. lower, preferably at least 20° C. lower, more particularly at least 40° C. lower than the melting temperature of the said chromium salt. However, this temperature is higher than room temperature. In general this temperature is at least 30° C., and more particularly at least 60° C., higher than room temperature. For example, when the melting temperature of the chromium salt is in the neighbourhood of 200° C. (chromium acetate and chromium acetylacetonate), the optimum preactivation temperature is between 100° and 195° C., the best results being obtained when the mixture is preactivated between 125° and 190° C.

It is obvious that, when the chromium salts decompose at a temperature which is lower than their melting temperature, the temperature of the preactivation stage (b) is lower than the decomposition temperature of the said chromium salt.

The duration of the treatment in stage (b) is generally between 0.5 and 18 hours, preferably between 1 and 6 hours. Particularly good results are obtained when the mixture is preactivated for a period of between 1.5 and 3 hours. This operation can be performed by keeping the catalyst in the same stationary-bed reactor as that employed above. The best results are obtained when the preactivation stage (b) is performed in a rotating-bed reactor or in a fluidised-bed reactor.

The preactivation stage (b) can be performed under an atmosphere of environmental air, dry air or molecular oxygen. The operation is preferably carried out under a dry air atmosphere.

Stage (b) and in particular the temperature at which it is appropriate to carry it out is an essential characteristic of the process according to the invention which makes it possible, during the subsequent activation (stage (c)), to ensure good dispersion of the chromium of the support and to avoid the formation of $Cr_2O_3$ agglomerates.

The catalyst precursor is generally next subjected to an activation stage (c) by calcination under an oxidising atmosphere so as to obtain active catalysts for the polymerisation of olefins. This last stage has the effect of converting at least part of the chromium compound to hexavalent chromium oxide.

This activation can take place, in a known manner, by heating, in the presence of optionally dried air or of molecular oxygen, at a temperature of at least 300° C., preferably at least 400° C., more particularly at least 450° C. The calcination temperature generally does not exceed 1200° C., preferably 1000° C. and more particularly 950° C. The activation is performed during a period which is generally between 30 minutes and 50 hours and more particularly between 2 and 20 hours. This operation can be carried out, for example, by keeping the catalyst in a tubular reactor made of quartz under dry air purging or by keeping it in a bed fluidised with dry air until the material has cooled. The temperature rise can be performed continuously or by marking one or a number of plateaus.

It is obvious that the activation stage (c) can be performed directly after the preactivation stage (b) of the mixture and in the same reactor.

The chromium is generally present in the final catalyst in proportions which vary from 0.05 to 10% by weight, preferably from 0.1% to 5% by weight, more particularly from 0.25 to 2% by weight of chromium on the basis of the total weight of the catalyst.

One of the advantages of the process for the preparation of catalysts for the polymerisation of olefins according to the invention is that it produces catalysts which are particularly active while being particularly simple and easy to use. In addition, it ensures a good distribution of the chromium compounds on the support. Furthermore, these catalysts are in most cases free from $Cr_2O_3$ agglomerates capable of affecting the quality of the polymers.

Another advantage of the process according to the invention is that it makes it possible to do away with the use of solutions of chromium compounds and consequently the recycling of these solutions and the treatment of effluents.

The present invention also relates to the catalysts for the polymerisation of olefins obtained by the process described above. These catalysts generally exhibit good catalytic properties. In particular, when the chromium salt is chromium acetylacetonate, very active catalysts are obtained which exhibit induction times, as defined later, which are particularly short.

Finally, the present invention relates to a process for polymerising olefins in the presence of the catalysts described above.

The chromium catalysts as described in the invention can be employed for the polymerisation and the copolymerisation of olefins containing from 2 to 8 carbon atoms per molecule and in particular for the production of ethylene homopolymers and of copolymers of ethylene with one or more comonomers selected from the higher olefins described above. These comonomers are preferably propylene, 1-butene, 1-pentene, 3-methyl-1-butene, 1-hexene, 3- and 4-methyl-1-pentenes and 1-octene. Diolefins containing from 4 to 18 carbon atoms can also be copolymerised with ethylene. The diolefins are preferably unconjugated aliphatic diolefins such as 1,4-hexadiene, unconjugated monocyclic diolefins such as 4-vinylcyclohexene or alicyclic diolefins containing an endocyclic bridge such as dicyclopentadiene, methyleneand ethylidenenorbornenes or conjugated aliphatic diolefins such as 1,3-butadiene, isoprene and 1,3-pentadiene.

The catalysts according to the invention are particularly well-suited for the manufacture of ethylene homopolymers and of copolymers containing at least 90%, preferably at least 95% by weight of ethylene. The preferred comonomers are propylene, 1-butene, 1-hexene and 1-octene.

The polymerisation may be performed by any known process: in solution, in suspension in a hydrocarbon diluent or in gaseous phase.

The catalysts of the invention find a particularly advantageous use in suspension polymerisations for the production of polymers exhibiting a wide range of variation in melt indexes and molecular mass distributions, these two parameters being controllable by methods which are well known in the art, such as, for example, the polymerisation conditions, the support activation conditions, its morphology etc.

The suspension polymerisation is performed in a hydrocarbon diluent such as liquid aliphatic, cycloaliphatic and aromatic hydrocarbons, at a temperature such that the polymer formed is insoluble therein. The preferred diluents are linear alkanes such as n-butane, n-hexane and n-heptane and branched alkanes such as isobutane, isopentane, isooctane and 2,2-dimethylpropane, or cycloalkanes such as cyclopentane and cyclohexane, and mixtures of these diluents.

The polymerisation temperature is generally chosen between 20° and 200° C., preferably between 50° and 150° C., in particular between 80° and 115° C. The ethylene pressure is in most cases chosen between atmospheric pressure and 50 bars, preferably between 4 and 20 bars, more particularly between 5 and 15 bars.

The polymerisation may be performed continuously or noncontinuously.

DESCRIPTION OF THE PREFERRED EMBODIMENTS

The following examples serve to illustrate the invention. The meaning of the symbols employed in these examples, the units expressing the quantities mentioned and the methods of measurement of these quantities are detailed below.

$T_1$=preactivation temperature (stage (b)) expressed in °C.
$H_1$=preactivation time (stage (b)) expresed in hours.
$T_2$=calcination temperature (stage (c)) expressed in °C.
$H_2$=calcination time (stage (c)) expressed in hours.
$\alpha$=catalyst activity conventionally expressed in grams of insoluble polymer obtained per hour and per gram of catalyst and divided by the molar fraction of ethylene in the diluent.
$t_{ind}$=induction time, defined as being the time elapsed between the introduction of the catalyst and the appearance of a pressure decrease characteristic of the onset of polymerisation.
MI=melt index, measured under a 2.16 kg load at 190° C. and expressed in g/10 min (ASTM standard D 1238).
HLMI=melt index, measured under a 21.6 kg load at 190° C. and expressed in g/10 min (ASTM standard D 1238).

EXAMPLES 1 to 4

A—Preparation of the Catalysts

The support, such as taught in Table I below, is mixed manually in a glass container with a chromium acetylacetonate powder in a quantity such that the chromium content of the mixture is equal to 10 g/kg (stage (a)). This mixture is then placed in a reactor containing a bed fluidised by dry air and heated for a time $H_1$ at the temperature $T_1$, as taught in Table I (stage (b)). The temperature $T_1$ is lower than the melting temperature of chromium acetylacetonate (210° C.). The catalyst precursor thus obtained is next activated in the same reactor under air purging by heat treatment at the temperature $T_1$ for a time $H_2$ before being returned to room temperature (stage (c)).

The catalysts are in the form of powders which are perfectly homogeneous and free from $Cr_2O_3$ agglomerates.

B—Ethylene Polymerisation—Reference Conditions 1 l of isobutane is introduced into a predried 3-l autoclave fitted with a stirrer and the temperature is then raised to 107° C. before a pressure of 6.6 bars of ethylene is produced therein and 100 mg of catalyst prepared according to A are introduced. During polymerisation the pressure in the reactor is kept constant by feeding ethylene at a measured flow rate. The polymerisation reaction is stopped by degassing when the ethylene consumption calculated from the flow rate measurement corresponds to a production efficiency of 2500 g of polyethylene per gram of catalyst.

The conditions of preparation of the catalysts and their performance in polymerisation are cited in Table I below.

TABLE I

| Examples | 1 | 2 | 3 | 4 |
|---|---|---|---|---|
| Support Composition (%) wt | $SiO_2$ 100 | $SiO_2/TiO_2$ 97.7/2.3 | $SiO_2/ZrO_2$ 94.3/5.7 | $AiO_2/Al_2O_3$ 87/13 |
| Trade name | 532 | Ticogel No. 2 | Zrcogel No. 1 | MS 13/110 |
| Company Preparation of the catalysts | Grace | Grace | Grace | Grace |
| stage (b) | | | | |
| $T_1$ | 190 | 150 | 150 | 150 |
| $H_1$ | 2 | 2 | 2 | 2 |
| stage (c) | | | | |
| $T_2$ | 815 | 815 | 700 | 815 |
| $H_2$ | 5 | 5 | 5 | 5 |
| $Cr_2O_3$ agglomerates | no | no | no | no |
| Performance in polymerisation | | | | |
| Activity, α | 45121 | 72848 | 36069 | 47203 |
| $t_{ind}$ | 15 | 12 | 12 | 12 |
| MI | 1.51 | 0.72 | 0.34 | 0.15 |
| HLMI | 88.5 | 49.76 | 64 | 14.6 |

EXAMPLES 5R to 8R

These examples are given by way of comparison.

The catalysts of Examples 5R, 6R and 7R are obtained as in Examples 1, 2 and 3 respectively, but with chromium acetylacetonate replaced with chromium trioxide.

The catalyst of Example 8R is prepared as in Example 1, but omitting the preactivation stage (b) at the temperature $T_1$.

The results of the polymerisation tests performed under the reference conditions are repeated in Table II below.

TABLE II

| Examples | 5R | 6R | 7R | 8R |
|---|---|---|---|---|
| Support Composition (%) | $SiO_2$ 100 | $SiO_2/TiO_2$ 97.7/2.3 | $SiO_2/Al_2O_3$ 94.3/5.7 | $SiO_2$ 100 |
| Trade name | 532 | Ticogel No. 2 | MS 13/110 | 532 |
| Company Preparation of the catalysts | Grace | Grace | Grace | Grace |
| stage (b) | | | | |
| $T_1$ | 190 | 150 | 150 | — |
| $H_1$ | 2 | 2 | 2 | — |
| stage (c) | | | | |
| $T_2$ | 815 | 815 | 815 | 815 |
| $H_2$ | 5 | 5 | 16 | 5 |
| $Cr_2O_3$ agglomerates | yes | yes | yes | yes |
| Performance in polymerisation | | | | |
| Activity, α | 37563 | 33719 | 5622 | 31799 |
| $t_{ind}$ | 16 | 20 | 22 | 22 |
| MI | 1.25 | 0.84 | — | 1.96 |
| HLMI | 71.4 | 49.3 | 3.6 | 91 |

(4) EXAMPLE 9

A—Preparation of the Catalyst

A silica 532 powder from Grace is precalcined in a fluidised bed under dry air at 700° C. for 16 hours. The precalcined support is then treated at 100° C. in the fluidised bed with nitrogen loaded with liquid titanium tetrachloride until the support is saturated with titanium tetrachloride. A chromium acetylacetonate powder is then added into the fluidised bed in a quantity such that the chromium content of the mixture is equal to 10 g/kg (stage (a)). This mixture is heated for 2 hours at 150° C. (stage (b)). The catalyst precursor thus obtained is next activated in the same fluidised bed under air purging by heat treatment at 700° C. for 5 hours (stage (c)) before being returned to room temperature. The catalyst is in the form of a powder which is perfectly homogeneous and free from $Cr_2O_3$ agglomerates.

B—Ethylene Polymerisation

The operations described in Examples 1 to 4 are repeated using the catalyst obtained in A. The following performance in polymerisation is obtained:

Activity, α=45293
$t_{ind}$=10
MI=1.49
HLMI=83.2.

I claim:

1. A process for the preparation of an activated catalyst for the polymerization of olefins, which process does not include a heat treatment in a non-oxidizing atmosphere, the process comprising:

a) mixing, in the absence of a solvent, at least one chromium salt with a support composition comprised of at least one compound (A) which is an inorganic, oxygen-containing compound of at least one element selected from the group consisting of Group IVb, IIIa and IVa, and at least one compound (B) which is an inorganic compound containing at least one element selected from the group consisting of Group IVb and IIIa, the at least one compound (B) being different from the at least one compound (A);

b) preactivating the mixture by heating for a period ranging from 0.5 to 18 hours without calcining in an oxidizing atmosphere to a temperature ranging from at least 30° C. above room temperature to a temperature which is lower than the decomposition temperature of the at least one chromium salt and which is 5° C. below the melting temperature of the at least one chromium salt to obtain a catalyst precursor; and c) activating the catalyst precursor by calcining in an oxidizing atmosphere at a temperature ranging from 300° to 1200° C. and under conditions such that at least part of the chromium is converted to hexavalent chromium.

2. The process according to claim 1, wherein the at least one compound (A) is selected from the group consisting of silica, alumina, and aluminum phosphate, and mixtures thereof.

3. The process according to claim 1 further comprising treating, prior to mixing in step (a), the at least one compound (A) in the solid state with a gas containing the at least one compound (B) to form the support composition.

4. The process according to claim 3, wherein treating is accomplished by using a bed of particles of the at least one compound (A) which is fluidized by means of the gas containing the at least one compound (B).

5. The process according to claim 3, further comprising subjecting the at least one compound (A) to a preactivation before the at least one compound (A) is treated with the at least one compound (B).

6. The process according to claim 1, wherein the at least one chromium salt is selected from the group consisting of organic chromium salts.

7. The process according to claim 6, wherein the at least one chromium salt is chromium acetylacetonate.

8. The process according to claim 1, wherein the at least one chromium salt is present in the mixture in proportions varying from 0.05 to 10% by weight relative to the total weight of the mixture.

9. The process according to claim 1, wherein the at least one compound (A) is an inorganic, oxygen-containing compound of an element selected from the group consisting of titanium, zirconium, aluminum, silicon, and thorium.

10. The process according to claim 9, wherein the at least one compound (A) is an inorganic, oxygen-containing compound selected from the group consisting of (a) oxides of titanium, zirconium, aluminum, silicon, and thorium, and (b) aluminum phosphate.

11. The process according to claim 1, wherein the at least one compound (B) is an inorganic compound of an element selected from the group consisting of titanium, zirconium, and aluminum.

12. The process according to claim 11, wherein the at least one compound (B) is an inorganic compound selected from the group consisting of (a) oxides or halides of titanium, zirconium, and aluminum, and (b) aluminum phosphate.

13. A process for the preparation of an activated catalyst for the polymerization of olefins, which process does not include a heat treatment in a non-oxidizing atmosphere, the process comprising:

a) mixing, in the absence of a solvent, at least one chromium salt with a support composition comprised of at least one compound (A) which is an inorganic, oxygen-containing compound of at least one element selected from the group consisting of Group IVb, IIIa and IVa, and at least one compound (B) which is an inorganic compound containing at least one element selected from the group consisting of Group IVb and IIIa, the at least one compound (B) being different from the at least one compound b) preactivating the mixture by heating without calcining in an oxidizing atmosphere at a temperature which is lower than the melting temperature of the at least one chromium salt to obtain a catalyst precursor; and c) activating the catalyst precursor by calcining in an oxidizing atmosphere at a temperature ranging from 300° to 1200° C. and under conditions such that at least part of the chromium is converted to hexavalent chromium, wherein the process further comprises treating, prior to mixing in step (a), the at least one compound (A) in the solid state with a gas containing the at least one compound (B) to form the support composition, and wherein treating is accomplished by using a bed of particles of the at least one compound (A) which is fluidized by means of the gas containing the at least one compound (B), and wherein the at least one compound (B) is $TiCl_4$.

14. A process for the preparation of an activated catalyst for the polymerization of olefins, which process does not include a heat treatment in a non-oxidizing atmosphere, the process comprising:

a) mixing, in the absence of a solvent, at least one chromium salt with a support composition comprised of at least one compound (A) which is an inorganic, oxygen-containing compound of at least one element selected from the group consisting of Group IVb, IIIa and IVa, and at least one compound (B) which is an inorganic compound containing at least one element selected from the group consisting of Group IVb and IIIa, the at least one compound (B) being different from the at least one compound b) preactivating the mixture by heating without calcining in an oxidizing atmosphere at a temperature which is lower than the melting temperature of the at least one chromium salt to obtain a catalyst precursor; and c) activating the catalyst precursor by calcining in an oxidizing atmosphere at a temperature ranging from 300° to 1200° C. and under conditions such that at least part of the chromium is converted to hexavalent chromium, wherein the process further comprises treating, prior to mixing in step (a), the at least one compound (A) in the solid state with a gas containing the at least one compound (B) to form the support composition, and wherein the at least one compound (B) is $TiCl_4$.

15. An activated catalyst for the polymerization of olefins, which is comprised of oxides of chromium, including at least some hexavalent chromium, and a support composition, which does not contain black carbon residues, and which is obtained by a two-step heat activation process including preactivating by heating without calcining followed by activating by calcining, but which does not include a heat treatment in a non-oxidizing atmosphere, the process, comprising:

a) mixing, in the absence of a solvent, at least one chromium salt with a support composition comprised of at least one compound (A) which is an inorganic, oxygen-containing compound of at least one element selected from the group consisting of Group IVb, IIIa and IVa, and at least one compound (B) which is an inorganic compound containing at least one element selected from the group consisting of Group IVb and IIIa, the at least one compound (B) being different from the at least one compound (A);

b) preactivating the mixture by heating for a period ranging from 0.5 to 18 hours without calcining in an oxidizing atmosphere to a temperature ranging from at least 30° C. above room temperature to a temperature which is lower than the decomposition temperature of the at least one chromium salt and which is 5° C. below the melting temperature of the at least one chromium salt to obtain a catalyst precursor; and c) activating the catalyst precursor by calcining in an oxidizing atmosphere at a temperature ranging from 300° to 1200° C. and under conditions such that at least part of the chromium is converted to hexavalent chromium.

* * * * *